(12) United States Patent
Engel et al.

(10) Patent No.: US 11,180,150 B2
(45) Date of Patent: Nov. 23, 2021

(54) METHOD FOR THE AUTONOMOUS OR PARTLY AUTONOMOUS EXECUTION OF A COOPERATIVE DRIVING MANEUVER

(71) Applicant: VOLKSWAGEN AG, Wolfsburg (DE)

(72) Inventors: Monique Engel, Braunschweig (DE); Bernd Rech, Bokensdorf (DE); Stefan Gläser, Braunschweig (DE); Teodor Buburuzan, Braunschweig (DE); Bernd Lehmann, Wolfsburg (DE); Sandra Kleinau, Rötgesbüttel (DE); Hendrik-Jörn Günther, Hannover (DE); Johannes Hartog, Braunschweig (DE)

(73) Assignee: Volkswagen AG

( * ) Notice: Subject to any disclaimer, the term of this patent is extended or adjusted under 35 U.S.C. 154(b) by 0 days.

(21) Appl. No.: 15/484,186

(22) Filed: Apr. 11, 2017

(65) Prior Publication Data

US 2017/0291608 A1    Oct. 12, 2017

(30) Foreign Application Priority Data

Apr. 11, 2016 (DE) ...................... 10 2016 205 972.6

(51) Int. Cl.
*B60W 30/18* (2012.01)
*H04W 84/18* (2009.01)
(Continued)

(52) U.S. Cl.
CPC ...... *B60W 30/18163* (2013.01); *B60W 30/12* (2013.01); *B60W 40/04* (2013.01);
(Continued)

(58) Field of Classification Search
None
See application file for complete search history.

(56) References Cited

U.S. PATENT DOCUMENTS 8,362,922 B2    1/2013  Kushi et al.
8,676,466 B2    3/2014  Mudalige
(Continued)

FOREIGN PATENT DOCUMENTS

CN    101361294 A    2/2009
CN    101542553 A    9/2009
(Continued)

OTHER PUBLICATIONS

Search Report for German Patent Application No. 10 2016 205 972.6; dated Oct. 25, 2016.
(Continued)

*Primary Examiner* — Lail A Kleinman
(74) *Attorney, Agent, or Firm* — Barnes & Thornburg LLP (57) ABSTRACT

A method for autonomously or semi-autonomously carrying out a cooperative driving maneuver and a vehicle. Provision is made for a maneuvering vehicle which plans the execution of a driving maneuver to determine a maneuvering area of a road in which the driving maneuver is potentially executed, to communicate with one or more vehicles via vehicle-to-vehicle communication to detect one or more cooperation vehicles which will presumably be inside the maneuvering area during the execution of the driving maneuver, and to adapt its own driving behavior to the presumable driving behavior of the one or more cooperation vehicles to execute the planned driving maneuver. The disclosure provides a possibility which, by vehicle-to-vehicle communication, allows vehicles for jointly carrying out a cooperative driving maneuver to be identified and then allows the cooperative driving maneuver to be executed.

16 Claims, 9 Drawing Sheets

(51) Int. Cl.

| | | |
|---|---|---|
| *G08G 1/0967* | (2006.01) | |
| *G08G 1/00* | (2006.01) | |
| *B60W 30/12* | (2020.01) | |
| *H04W 84/00* | (2009.01) | |
| *G05D 1/02* | (2020.01) | |
| *B60W 40/04* | (2006.01) | |
| *G05D 1/00* | (2006.01) | |
| *G08G 1/16* | (2006.01) | |

(52) U.S. Cl.
CPC ......... *G05D 1/0088* (2013.01); *G05D 1/0276* (2013.01); *G05D 1/0289* (2013.01); *G08G 1/09675* (2013.01); *G08G 1/096725* (2013.01); *G08G 1/096741* (2013.01); *G08G 1/096791* (2013.01); *G08G 1/161* (2013.01); *G08G 1/22* (2013.01); *H04W 84/005* (2013.01); *H04W 84/18* (2013.01); *B60W 2420/42* (2013.01); *B60W 2554/801* (2020.02); *B60W 2756/10* (2020.02); *G05D 1/0257* (2013.01); *G05D 2201/0213* (2013.01)

(56) References Cited

U.S. PATENT DOCUMENTS

| | | | |
|---|---|---|---|
| 8,810,431 | B2 | 8/2014 | Mudalige et al. |
| 9,076,338 | B2 | 7/2015 | Taguchi et al. |
| 9,157,761 | B2 | 10/2015 | Levin |
| 9,406,233 | B2 | 8/2016 | Jo |
| 9,483,947 | B2 | 11/2016 | Strassberger |
| 9,620,017 | B2 | 4/2017 | Trageser |
| 9,771,070 | B2 | 9/2017 | Zagorski et al. |
| 2010/0256852 | A1* | 10/2010 | Mudalige ............... G08G 1/163 701/24 |
| 2014/0365104 | A1* | 12/2014 | Sasaki ............. B60W 30/18154 701/119 |
| 2017/0186327 | A1* | 6/2017 | Uysal ....................... G08G 1/22 |

FOREIGN PATENT DOCUMENTS

| | | |
|---|---|---|
| CN | 101859494 A | 10/2010 |
| CN | 102054365 A | 5/2011 |
| CN | 102717752 A | 10/2012 |
| CN | 103065500 A | 4/2013 |
| CN | 103158705 A | 6/2013 |
| CN | 103794086 A | 5/2014 |
| CN | 104115198 A | 10/2014 |
| CN | 104169994 A | 11/2014 |
| CN | 104424817 A | 3/2015 |
| CN | 104424819 A | 3/2015 |
| CN | 104442826 A | 3/2015 |
| CN | 104464317 A | 3/2015 |
| CN | 105206068 A | 12/2015 |
| CN | 105427669 A | 3/2016 |
| DE | 102007015032 A1 | 1/2008 |
| DE | 102013013867 A1 | 3/2015 |
| DE | 102014215980 A1 | 2/2016 |
| DE | 102014216257 A1 | 2/2016 |
| DE | 102015214689 A1 | 2/2016 |
| EP | 1981182 A1 | 10/2008 |
| EP | 2827319 A1 | 1/2015 |

OTHER PUBLICATIONS

Office Action for Chinese Patent Application No. 201710232277.0; dated Dec. 25, 2019.
Office Action for Chinese Patent Application No. 201710232277.0; dated Aug. 12, 2020.
Office Action for Chinese Patent Application No. 201710232277.0; dated Apr. 8, 2021.

* cited by examiner

METHOD FOR THE AUTONOMOUS OR PARTLY AUTONOMOUS EXECUTION OF A COOPERATIVE DRIVING MANEUVER

PRIORITY CLAIM

This patent application claims priority to German Patent Application No. 10 2016 205 972.6, filed 11 Apr. 2016, the disclosure of which is incorporated herein by reference in its entirety.

SUMMARY

Illustrative embodiments relate to a method for autonomously or semi-autonomously carrying out a cooperative driving maneuver and to a vehicle.

BRIEF DESCRIPTION OF THE DRAWINGS

Exemplary embodiments are explained below based on the associated drawings, in which.

DETAILED DESCRIPTION

At least two vehicles are usually involved in a cooperative driving maneuver, namely a maneuvering vehicle which plans the execution of a driving maneuver, and at least one corporation vehicle with which the maneuvering vehicle cooperates to implement the planned driving maneuver.

In principle, both the maneuvering vehicle and the cooperation vehicle may adapt their driving behavior so that the planned driving maneuver of the maneuvering vehicle can be implemented.

The prior art already uses adaptive cruise control systems which assist the vehicle driver in complying with a suitable distance from the vehicle in front. Such systems are known, for example, under the designations Adaptive Cruise Control (ACC) and Automatic Distance Regulation (ADR). In this case, the distance from the vehicle in front is continuously monitored, the determined distance being taken into account as a manipulated variable when adapting the vehicle speed.

Vehicles will soon be increasingly equipped with communication systems or services. A first type of service establishes a communication connection between vehicles or from a vehicle to an infrastructure, for example, traffic lights. Such concepts are referred to, for example, as car-to-car systems, car-to-infrastructure systems or car-to-X systems, where the X is a placeholder for any desired infrastructure devices, other vehicles and other road users. Further conventional designations are Car2C, Car2X, C2C and C2X systems, vehicle-to-vehicle systems (V2V), vehicle-to-infrastructure systems (V2I) or vehicle-to-X systems (V2X).

This communication between vehicles or between vehicles and the infrastructure is fundamentally also suitable for assisting with cooperative driving maneuvers. However, a vehicle will communicate with a multiplicity of different vehicles during the journey, in which case at least some of these vehicles are not possible for jointly carrying out a cooperative driving maneuver.

Disclosed embodiments are now based on providing a possibility which, by means of vehicle-to-vehicle communication, allows vehicles for jointly carrying out a cooperative driving maneuver to be identified and then allows the cooperative driving maneuver to be executed.

This is achieved by means of disclosed methods and a vehicle.

In the disclosed method, a maneuvering vehicle which plans the execution of a driving maneuver determines a maneuvering area of a road in which the driving maneuver can be potentially executed. The maneuvering vehicle then communicates with one or more vehicles via vehicle-to-vehicle communication to detect one or more cooperation vehicles which will presumably be inside the maneuvering area during the execution of the driving maneuver. After detecting one or more cooperation vehicles, the maneuvering vehicle adapts its driving behavior to the presumable driving behavior of the one or more cooperation vehicles to execute the planned driving maneuver. The maneuvering area in which the driving maneuver can be potentially executed comprises all road areas in which the planned driving maneuver can be implemented. A digital roadmap which is locally available in the vehicle, for example, and/or is retrieved from a service via a radio connection may be used to determine the maneuvering area.

The disclosed method provides that vehicles which are in the surrounding area and are not possible as cooperation vehicles are not considered as cooperation vehicles because they will presumably be remote from the maneuvering area while the driving maneuver is being carried out or will use a lane which is not relevant to the driving maneuver. Filtering according to vehicles which are relevant to carrying out the planned driving maneuver therefore takes place. This allows cooperative driving maneuvers to be implemented safely and effectively.

The maneuvering vehicle and/or the one or more cooperation vehicles may be, for example, automobiles, commercial vehicles or two-wheeled vehicles. The driving maneuver planned by the maneuvering vehicle may be, for example, entering the flowing road traffic (merging) or an overtaking operation which requires a lane change. In addition to the vehicle-to-vehicle communication, infrastructure on the periphery of the road, for example, traffic lights, can also be incorporated in the communication. The information received from the one or more vehicles via vehicle-to-vehicle communication may relate to the position, the speed, the direction of travel or the lane, for example. Alternatively or additionally, the received information may also relate to objects which have been detected by the communication partners.

Before executing the driving maneuver, the maneuvering vehicle may determine a driving maneuver to be executed automatically or on the basis of an input by the vehicle driver. The maneuvering area in which the driving maneuver can be potentially executed may also comprise road sections which will presumably not be used during the execution of the maneuver, but the use of these road sections cannot be entirely excluded. This reduces the risk of an accident in extraordinary driving situations.

The maneuvering vehicle may determine an approach period in which it will presumably reach the maneuvering area. For this purpose, the maneuvering vehicle predicts the theoretically shortest approach period to the maneuvering area and the theoretically longest approach period to the maneuvering area taking into account its driving situation and possibly necessary delays to its journey. The shortest approach period may depend on the speed of the traffic in the area surrounding the maneuvering vehicle, the traffic rules to be complied with and the driving speeds which are predefined by the course of the road and can be implemented. The acceleration and/or deceleration values of the maneuvering vehicle which are permissible during the approach to the maneuvering area could be parameterized in predefined limits. The maneuvering vehicle may also determine the maneuvering period within which the driving maneuver can be executed. This makes it possible to further reduce the risk of an accident if an unexpected driving situation arises after the execution of the driving maneuver has started.

To detect the one or more cooperation vehicles, the maneuvering vehicle can determine the message formats of the messages received via vehicle-to-vehicle communication. One or more potential cooperation vehicles can then be determined on the basis of the determined message format. Only vehicles which transmit messages in a format which is indicative of free areas in the road area relevant to the driving maneuver are taken into account. Only vehicles which transmit Environmental Perception Messages (EPM) may be considered as potential cooperation vehicles. Environmental perception messages allow free areas between vehicles to be reliably determined, the position, the size and/or the onward movement of the free area being able to be derived from the data. Vehicles usually transmit environmental perception messages several times a second. The transmitted information is determined by the vehicle by means of sensors, for example, radar.

To detect the one or more cooperation vehicles, the maneuvering vehicle can determine approach areas of the road, from which the maneuvering area can be theoretically reached within the approach period. After the approach areas have been determined, one or more potential cooperation vehicles which are in the approach areas can be determined. This is effected using the data received via vehicle-to-vehicle communication. After determining one or more potential cooperation vehicles, the driving behavior of each potential cooperation vehicle can be predicted by means of the data received via vehicle-to-vehicle communication. At the same time, the maneuvering vehicle can predict its own driving behavior, with the result that the predicted driving behavior of the one or more potential cooperation vehicles can be compared with the maneuvering vehicle's own predicted driving behavior. One or more actual cooperation vehicles can then be identified within the potential cooperation vehicles on the basis of this comparison. The prediction of the driving behavior may comprise predicting a presumable distance/time profile and/or may take into account the probability of a lane change.

The maneuvering vehicle can continuously detect and evaluate the development of free areas between vehicles. For this purpose, the minimum size of a free area for carrying out the driving maneuver can be determined. The minimum size of a free area for carrying out a driving maneuver may be determined on the basis of the speed at which the free area moves on, the vehicle dimensions of the maneuvering vehicle and/or a safety distance to be complied with. With regard to the vehicle dimensions of the maneuvering vehicle, additional vehicles coupled to the maneuvering vehicle, for example, trailers and an overhanging load, may also be taken into account. The safety distance to be complied with may be dependent on the speed of the maneuvering vehicle and/or the speed at which the free area moves on. The size of the detected free area can then be compared with the determined minimum size, with the result that a suitable free area which will presumably be inside the maneuvering area during the planned execution of the maneuver and will have at least the minimum size for executing the driving maneuver can be selected. The selected free area now moves in the direction of the maneuvering area of the road, the driving maneuver of the maneuvering vehicle being able to be executed as soon as the selected free area has reached the maneuvering area.

Before the driving maneuver of the maneuvering vehicle is executed, a free area which has already been selected may be ruled out for executing the driving maneuver of the maneuvering vehicle, for example, as a result of an unexpected driving behavior of other vehicles, since the free area now falls below the previously determined minimum size. This shows that the free areas should be continuously detected and evaluated until the driving maneuver of the maneuvering vehicle is carried out. In this case, a new suitable free area which will presumably be inside the maneuvering area during the planned execution of the maneuver and will have at least the minimum size for executing the driving maneuver can be selected. The newly selected free area may already have been previously determined as an alternative free area which is suitable for carrying out the driving maneuver. Alternatively, the newly selected free area may be determined only after the previously already selected free area has been ruled out.

The adaptation of the driving behavior of the maneuvering vehicle to the presumable driving behavior of the one or more cooperation vehicles may comprise adapting the trajectory of the maneuvering vehicle to reach the selected free area if the latter is inside the maneuvering area. The trajectory may be effected, for example, by setting a selected distance/time profile and therefore by setting suitable acceleration or deceleration values. In addition, the executability of the driving maneuver can be cyclically checked as the free area is approached by the maneuvering vehicle.

In the disclosed method, which can also develop one of the methods described above, a maneuvering area of a road in which a driving maneuver of a vehicle can be expected is determined. The determination can be effected directly by the cooperation vehicle, for example. Alternatively or additionally, the determination can be effected by virtue of the cooperation vehicle receiving, via vehicle-to-vehicle communication, corresponding maneuvering information from a maneuvering vehicle which is planning to carry out a driving maneuver. The cooperation vehicle now communicates with one or more vehicles via vehicle-to-vehicle communication to detect a maneuvering vehicle, which is planning the execution of a driving maneuver and will presumably be inside the maneuvering area during the execution of the driving maneuver, and adapts its own driving behavior to the presumable driving behavior of the maneuvering vehicle to assist with the planned driving maneuver of the maneuvering vehicle. In addition, the maneuvering vehicle and the cooperation vehicle may match their driving behavior to one another in such a manner that the acceleration and/or braking operations of the maneuvering vehicle and/or of the cooperation vehicle which are needed to carry out the driving maneuver minimize the joint energy consumption for carrying out the driving maneuver. The matching of the maneuvering vehicle and of the cooperation vehicle can also be based on maximizing the probability of the successful implementation for the planned driving maneuver of the maneuvering vehicle.

The maneuvering area may be determined directly by the cooperation vehicle. For this purpose, the cooperation vehicle can use a digital roadmap which is locally available in the cooperation vehicle, for example, and/or is retrieved from a service, for example, via a radio connection. The cooperation vehicle can determine an approach period in which it will presumably reach the maneuvering area. For this purpose, the cooperation vehicle predicts the theoretically shortest approach period to the maneuvering area and the theoretically longest approach period to the maneuvering area taking into account its driving situation and possibly necessary delays to its journey. The shortest approach period may depend on the speed of the traffic in the area surrounding the cooperation vehicle, the traffic rules to be complied with and the driving speeds which are predefined by the course of the road and can be implemented. The acceleration and/or deceleration values of the cooperation vehicle which are permissible during the approach to the maneuvering area could be parameterized in predefined limits. The cooperation vehicle can also determine the maneuvering period within which the driving maneuver, which can be expected in the maneuvering area, can be executed. This can further reduce the risk of an accident if an unexpected driving situation arises after the execution of a driving maneuver of a maneuvering vehicle has started.

The maneuvering vehicle may also communicate a maneuvering area to the cooperation vehicle by means of vehicle-to-vehicle communication. This is beneficial if the possible maneuvering area comprises a very large section of the road. This makes it possible to improve the cooperation between the maneuvering vehicle and the cooperation vehicle, road areas for carrying out cooperative driving maneuvers of other vehicles being released at the same time.

To detect the maneuvering vehicle, the cooperation vehicle can determine the message formats of the messages received via vehicle-to-vehicle communication. One or more potential maneuvering vehicles can then be determined on the basis of the determined message format. Only vehicles which transmit messages in a format which is indicative of a planned driving maneuver are taken into account.

The cooperation vehicle may also determine potential maneuvering vehicles taking into account an environmental model. The environmental model links information from a digital map, from sensors of the vehicle, for example, a radar sensor or a camera, and the information received via vehicle-to-vehicle communication. Relevant objects in the surrounding area can therefore be detected. At the same time, properties such as the position, speed, acceleration or vehicle length can be assigned to the objects. To detect the maneuvering vehicle, the cooperation vehicle can determine approach areas of the road, from which the maneuvering area can be theoretically reached within the approach period. After the approach areas have been determined, one or more potential maneuvering vehicles which are in the approach areas can be determined. This is effected using the data received via vehicle-to-vehicle communication. After determining one or more potential maneuvering vehicles, the driving behavior of each potential maneuvering vehicle can be predicted by means of the data received via vehicle-to-vehicle communication. At the same time, the cooperation vehicle can predict its own driving behavior, with the result that the predicted driving behavior of the one or more potential maneuvering vehicles can be compared with the cooperation vehicle's own predicted driving behavior. An actual maneuvering vehicle can then be identified from the potential maneuvering vehicles on the basis of this comparison. The prediction of the driving behavior may comprise predicting a presumable distance/time profile and/or may take into account the probability of a lane change. The cooperation vehicle may also determine its own deceleration or acceleration for each potential maneuvering vehicle, which would be needed to assist with the driving maneuver of the maneuvering vehicle, and can compare this with a predetermined maximum deceleration or a predetermined maximum acceleration. If the necessary deceleration exceeds the predetermined maximum deceleration or the necessary acceleration exceeds the predetermined maximum acceleration, the potential maneuvering vehicle is not taken into account as an actual maneuvering vehicle and is excluded. The maximum deceleration and the maximum acceleration can be parameterized. If the cooperation vehicle identifies a plurality of maneuvering vehicles, it is possible for the cooperation vehicle to select that maneuvering vehicle for which adaptation of its own driving behavior gives rise to the lowest costs.

The adaptation of the driving behavior of the cooperation vehicle to the presumable driving behavior of the maneuvering vehicle may comprise adapting the trajectory of the cooperation vehicle to enlarge a free area in which the driving maneuver of the maneuvering vehicle can be executed inside the maneuvering area. The adaptation of the trajectory of the cooperation vehicle may be fully concluded upon reaching the maneuvering area, but is fully concluded at least before leaving the maneuvering area. Distance control with respect to the identified maneuvering vehicle can be considered as an example of such a trajectory adaptation. The maneuvering vehicle is projected, as an imaginary object, onto the lane of the cooperation vehicle. A point behind the rear of the maneuvering vehicle is selected as the following point for the distance control. The position of this following point can be parameterized in predefined limits.

The disclosed vehicle comprises a communication device for communicating with other vehicles by means of vehicle-to-vehicle communication, and a control device for autonomously or semi-autonomously carrying out a driving maneuver. The disclosed vehicle is set up to execute the method for autonomously or semi-autonomously carrying out a cooperative driving maneuver according to at least one of the exemplary embodiments described above as a maneuvering vehicle and/or as a cooperation vehicle. The same benefits and modifications as described above apply.

Further configurations of the disclosed embodiments emerge from the other features mentioned.

The various embodiments mentioned in this application can be combined with one another, unless stated otherwise in the individual case.

Figure 1:
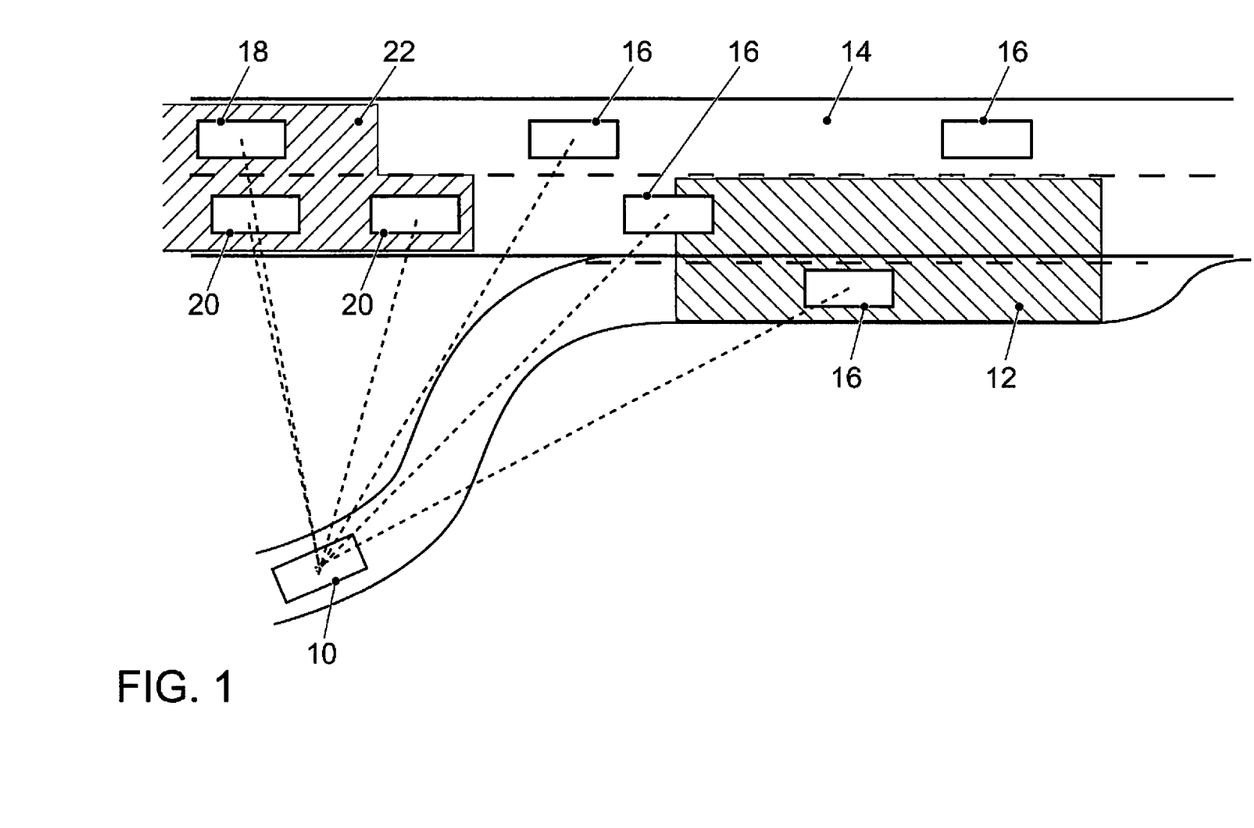
FIG. 1 shows a schematic illustration of a traffic situation during the execution of the disclosed method.

FIG. 1 shows a traffic situation during the execution of the disclosed method for autonomously or semi-autonomously carrying out a cooperative driving maneuver. A maneuvering vehicle 10 plans the execution of a driving maneuver, namely entering the flowing road traffic (merging) on a freeway. The maneuvering vehicle 10 moves from a freeway entrance ramp in the direction of the freeway. The maneuvering vehicle 10 first of all determines a maneuvering area 12 of the road 14 in which it is potentially possible to enter the flowing road traffic. At the same time, the maneuvering vehicle 10 communicates with a plurality of vehicles 16, 18, 20 via vehicle-to-vehicle communication to detect a plurality of cooperation vehicles 20 which will presumably be inside the maneuvering area 12 during the execution of the driving maneuver. In addition, the maneuvering vehicle 10 determines an approach period in which it will presumably reach the maneuvering area 12. For this purpose, the maneuvering vehicle 10 predicts the theoretically shortest approach period to the maneuvering area 12 and the theoretically longest approach period to the maneuvering area 12 taking into account its driving situation. On account of the free entrance ramp, the shortest approach period depends only on the traffic rules to be complied with and the driving speeds which are predefined by the course of the road and can be implemented. The longest approach period depends only on a minimum speed which is predetermined for the driving maneuver to be executed, namely the merging. To detect the cooperation vehicles 20, the maneuvering vehicle 10 determines one or more approach areas 22 of the road 14, from which the maneuvering area 12 can be theoretically reached within the approach period. The maneuvering vehicle 10 additionally determines the message formats of the messages received via vehicle-to-vehicle communication. Vehicles which transmit Environmental Perception Messages (EPM) and are in the approach area 22 are identified as potential cooperation vehicles 18, 20.

Figure 2:
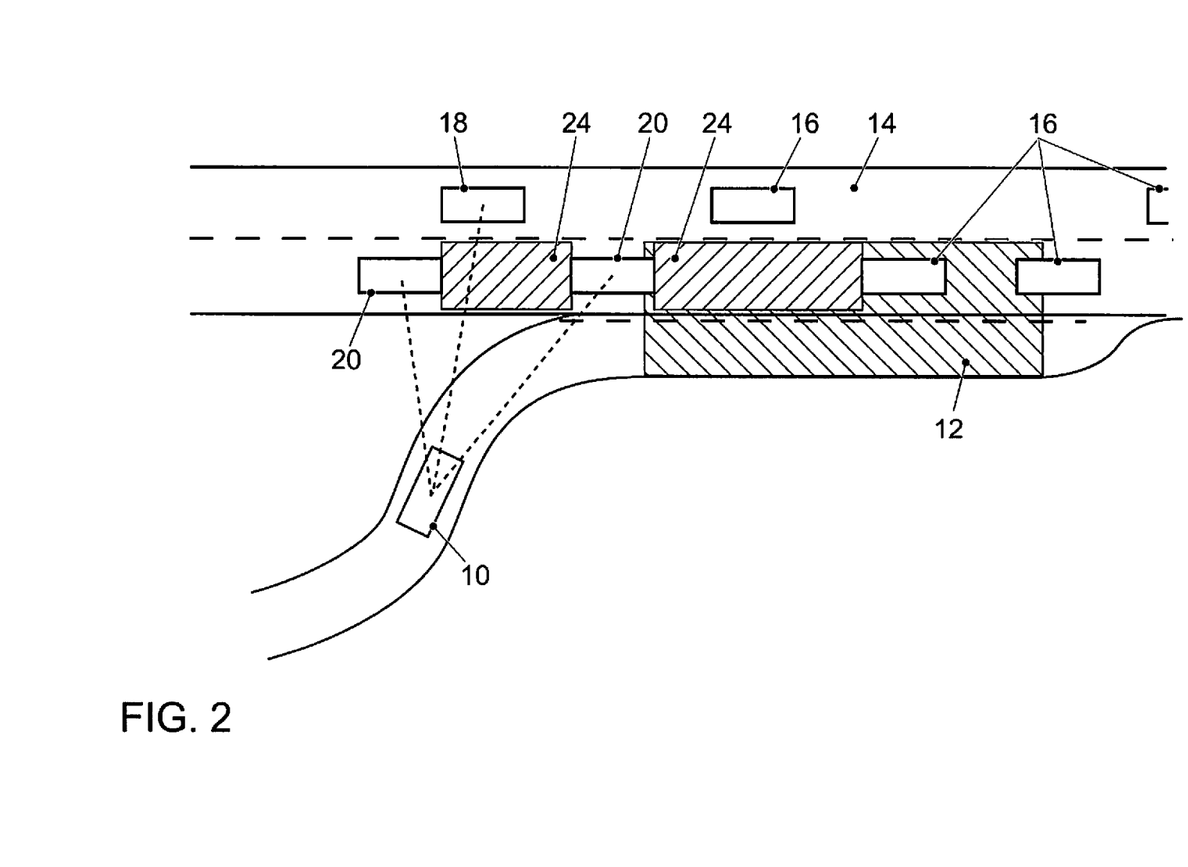
FIG. 2 shows a schematic illustration of a traffic situation during the execution of the disclosed method which follows the traffic situation illustrated in FIG. 1.

As illustrated in FIG. 2, the vehicles 16, 18, 20 are filtered according to relevance to the planned driving maneuver. The vehicles 16 which are not possible as potential cooperation vehicles are not considered any further. The vehicles 16 can nevertheless be monitored or observed further to determine a change of course of a vehicle 16 into the maneuvering area 12 and to determine an associated change in the maneuvering area 12 or unusability of the maneuvering area 12 and to accordingly take these into account if necessary.

The maneuvering vehicle 10 now predicts the driving behavior of the potential cooperation vehicles 18, 20 by means of the data received via vehicle-to-vehicle communication. At the same time, the maneuvering vehicle 10 predicts its own driving behavior, with the result that the predicted driving behavior of the potential cooperation vehicles 18, 20 can be compared with the maneuvering vehicle's own predicted driving behavior to determine the actual cooperation vehicles 20. The maneuvering vehicle 10 continuously detects the development of free areas 24 between the cooperation vehicles 20 and likewise continuously evaluates this. For this purpose, the maneuvering vehicle determines the minimum size of a free area 24 for carrying out the merging maneuver. To determine the minimum size of a free area 24, the maneuvering vehicle 10 takes into account the speed at which the free area 24 moves on, its own vehicle dimensions and a safety distance to be complied with. The maneuvering vehicle 10 then compares the size of the detected free areas 24 with the determined minimum size and selects the free area 24, which will presumably be inside the maneuvering area 12 during the planned execution of the maneuver and will at least have the minimum size for executing the driving maneuver, for executing the merging maneuver.

Figure 3:
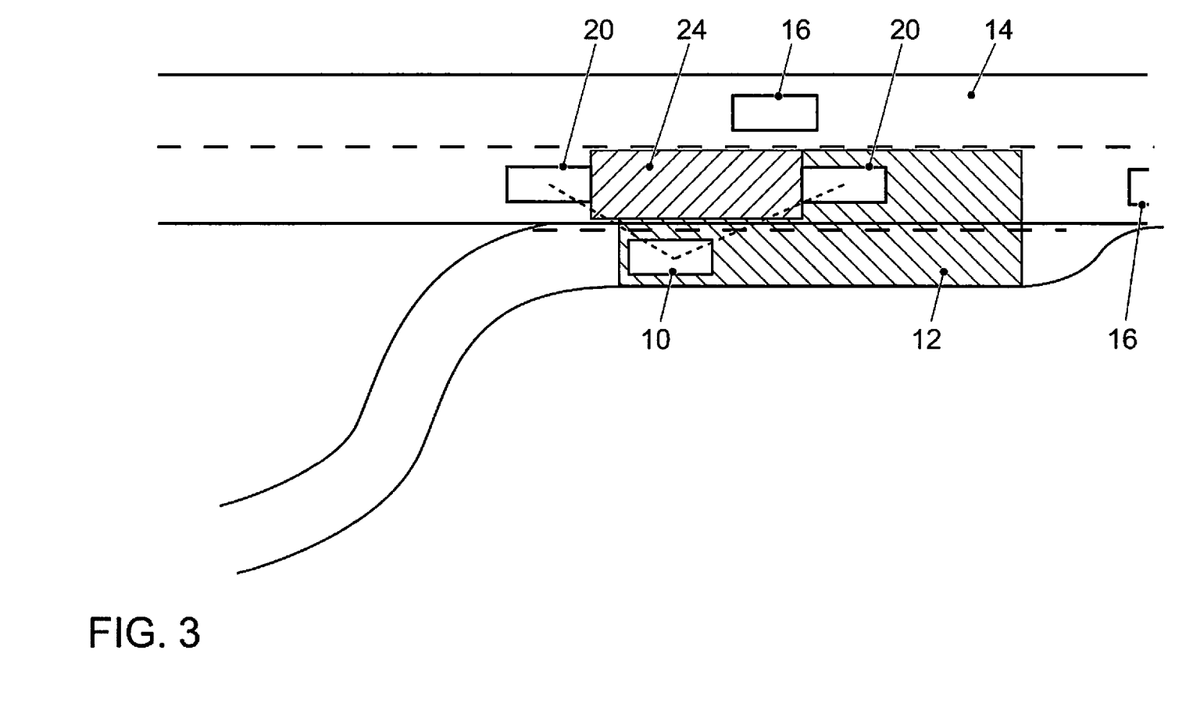
FIG. 3 shows a schematic illustration of a traffic situation during the execution of the disclosed method which follows the traffic situation illustrated in FIG. 2.
Figure 4:
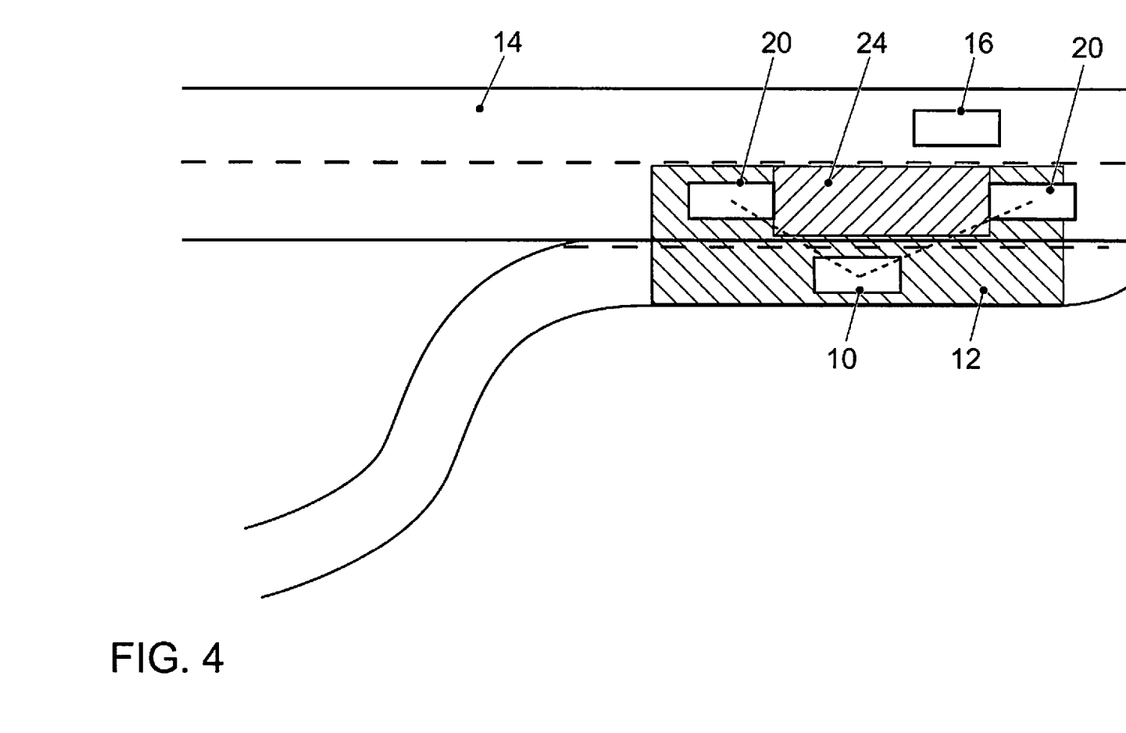
FIG. 4 shows a schematic illustration of a traffic situation during the execution of the disclosed method which follows the traffic situation illustrated in FIG. 3.

As is clear from FIG. 3 and FIG. 4, the maneuvering vehicle adapts its own driving behavior to the presumable driving behavior of the cooperation vehicles 20 to be able to execute the planned merging maneuver after the maneuvering vehicle 10 has selected a free area 24 for executing the merging maneuver. In this case, the adaptation of the driving behavior of the maneuvering vehicle 10 to the presumable driving behavior of the cooperation vehicles 20 comprises adapting the trajectory of the maneuvering vehicle 10 to reach the selected free area 24 if the latter is inside the maneuvering area 12. The trajectory can be effected, for example, by setting a selected distance/time profile and therefore by setting suitable acceleration or deceleration values. As the maneuvering vehicle 10 approaches the free area 24, the executability of the driving maneuver can also be cyclically checked.

Figure 5:
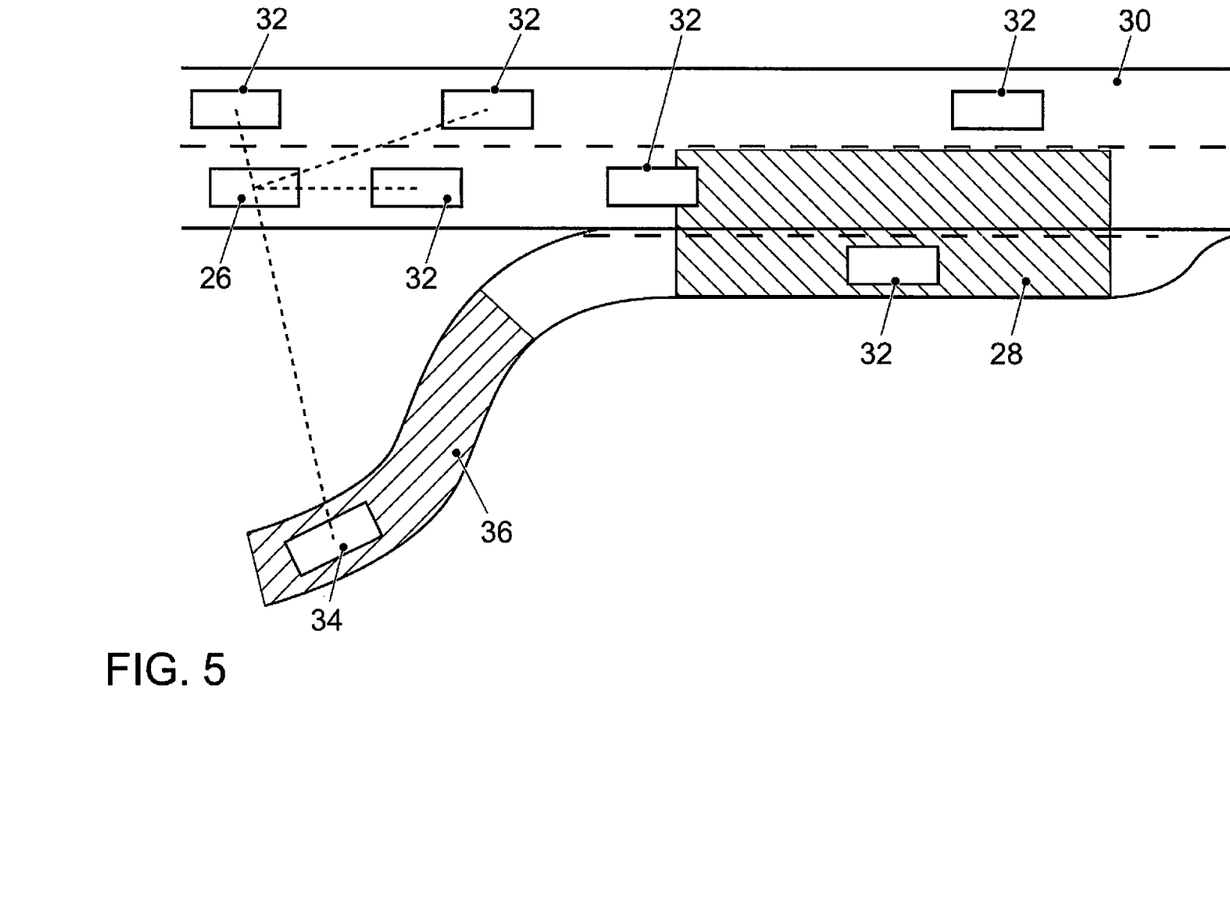
FIG. 5 shows a schematic illustration of a traffic situation during the execution of the disclosed method.

FIG. 5 likewise shows a traffic situation during the execution of the disclosed method for autonomously or semi-autonomously carrying out a cooperative driving maneuver. A cooperation vehicle 26 determines a maneuvering area 28 of a road 30 in which a driving maneuver of another vehicle can be expected. In this traffic situation, the cooperation vehicle detects an area in which a merging maneuver of a maneuvering vehicle can be expected. The cooperation vehicle 26 also communicates with a plurality of vehicles 32, 34 via vehicle-to-vehicle communication to detect a maneuvering vehicle 34 which is planning the execution of a merging maneuver in the maneuvering area 28. The cooperation vehicle 26 also determines an approach period in which it will presumably reach the maneuvering area 28. For this purpose, the cooperation vehicle 26 predicts the theoretically shortest approach period to the maneuvering area 28 and the theoretically longest approach period to the maneuvering area 28 taking into account its driving situation.

The shortest approach period depends on the speed of the traffic in the area surrounding the cooperation vehicle 26 and the traffic rules to be complied with. The longest approach period likewise depends on the speed of the traffic in the area surrounding the cooperation vehicle 26 and on a minimum speed predetermined for the driving maneuver to be executed, namely the merging. To detect the maneuvering vehicle 34, the cooperation vehicle 26 determines approach areas 36 of the road 30, from which the maneuvering area 28 can be theoretically reached within the approach period.

Figure 6:
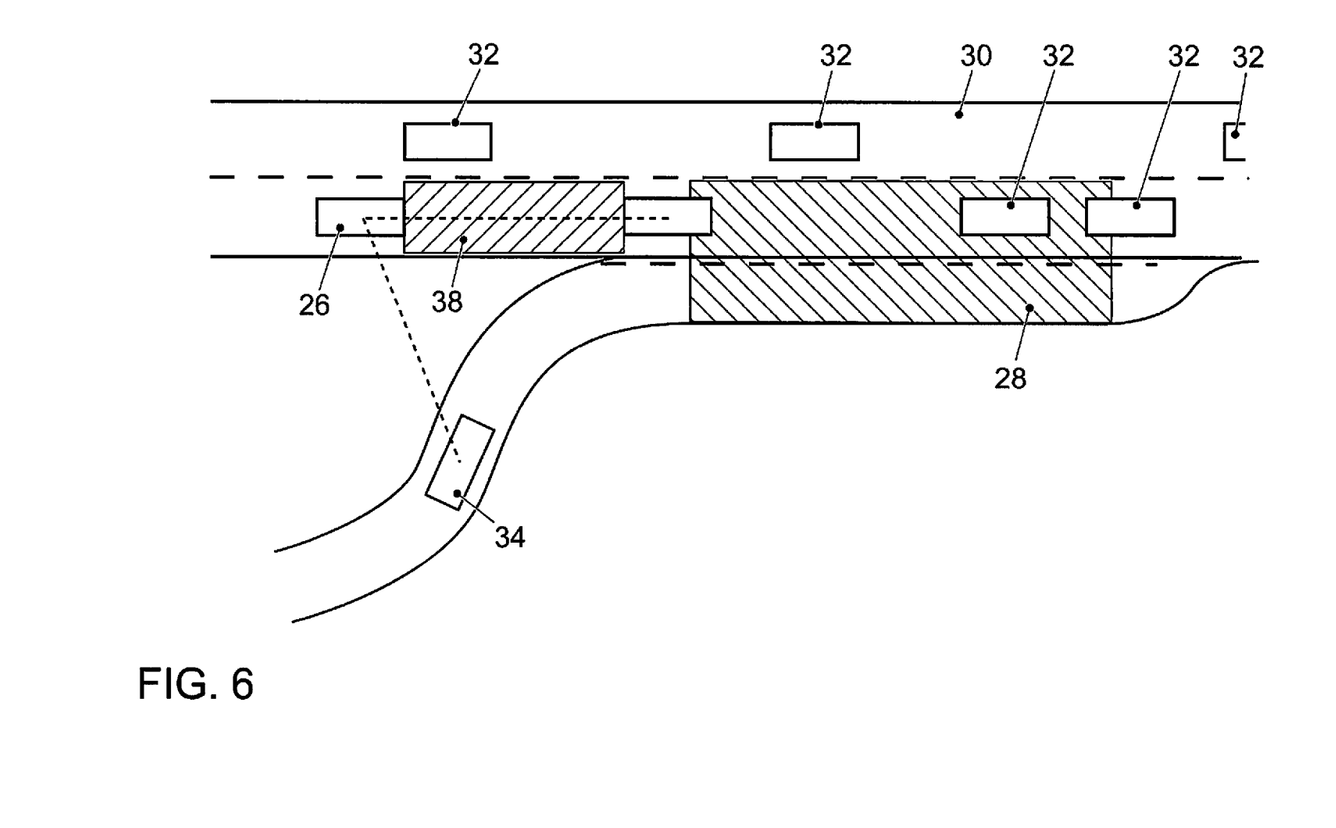
FIG. 6 shows a schematic illustration of a traffic situation during the execution of the disclosed method which follows the traffic situation illustrated in FIG. 5.

As illustrated in FIG. 6, the vehicles 32, 34 are filtered according to relevance to the expected driving maneuver. The vehicles 32 which are not possible as potential maneuvering vehicles are not considered any further. The vehicles 32 can nevertheless be monitored or observed further to determine a change of course of a vehicle 32 into the maneuvering area 28 and to determine an associated change in the maneuvering area 28 or unusability of the maneuvering area 28 and to accordingly take these into account if necessary.

The cooperation vehicle 26 predicts the driving behavior of the potential maneuvering vehicle 34 by means of the data received via vehicle-to-vehicle communication. At the same time, the cooperation vehicle 26 predicts its own driving behavior. The predicted driving behavior of the potential maneuvering vehicle 34 can therefore be compared with the cooperation vehicle's own predicted driving behavior, with the result that the potential maneuvering vehicle can be identified as an actual maneuvering vehicle 34.

Figure 7:
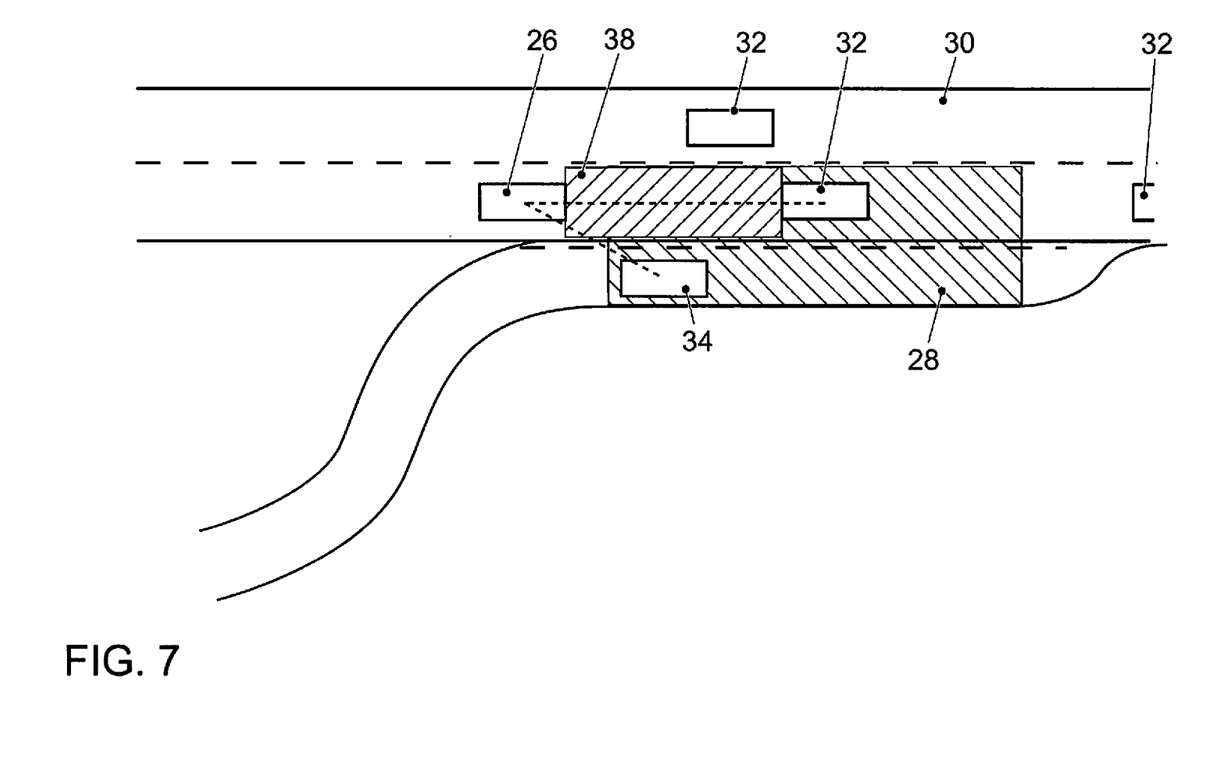
FIG. 7 shows a schematic illustration of a traffic situation during the execution of the disclosed method which follows the traffic situation illustrated in FIG. 6.
Figure 8:
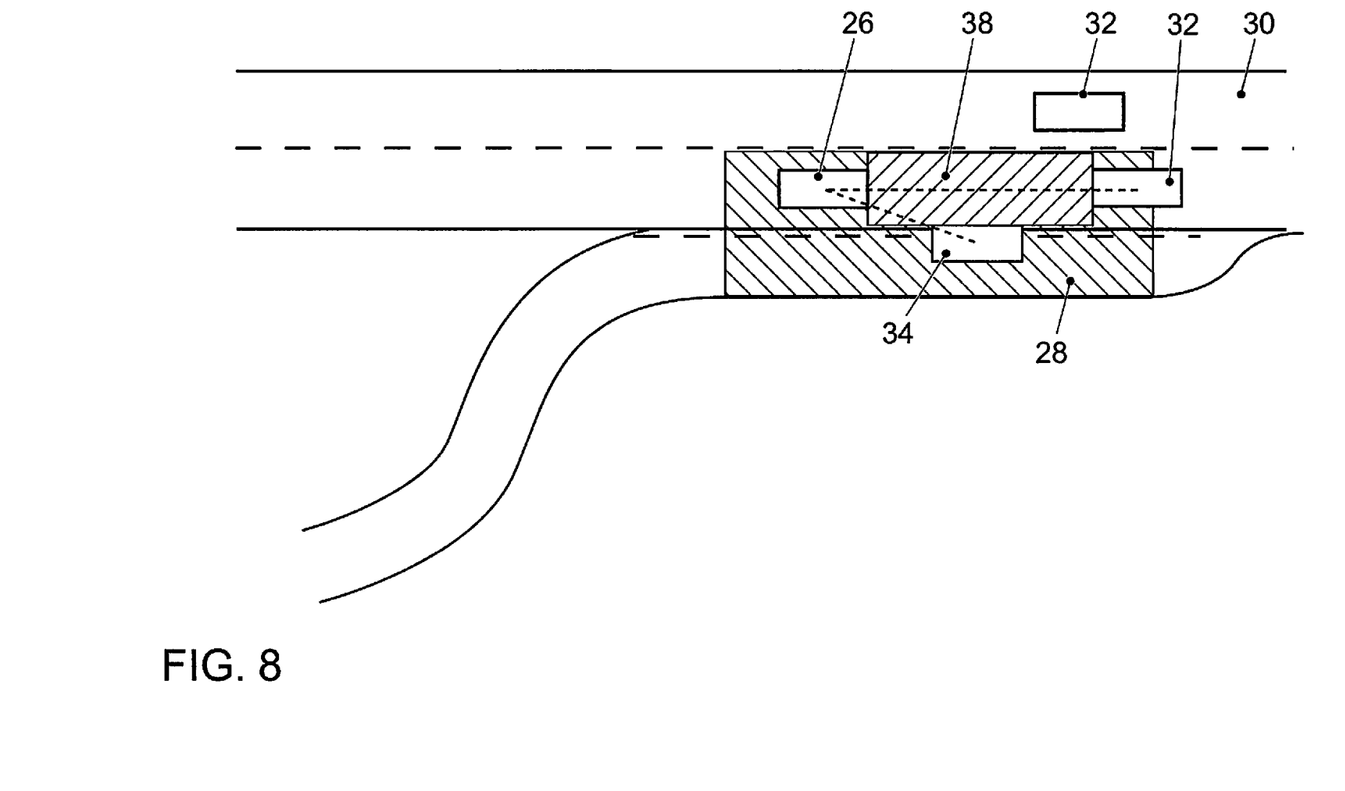
FIG. 8 shows a schematic illustration of a traffic situation during the execution of the disclosed method which follows the traffic situation illustrated in FIG. 7.

As is clear from FIG. 7 and FIG. 8, the cooperation vehicle 26 adapts its own driving behavior to the presumable driving behavior of the maneuvering vehicle 34 to assist with the planned merging maneuver of the maneuvering vehicle 34. The adaptation of the driving behavior of the cooperation vehicle 26 to the presumable driving behavior of the maneuvering vehicle 34 comprises adapting the trajectory of the cooperation vehicle 26 to enlarge a free area 38 in which the merging maneuver of the maneuvering vehicle 34 can be executed inside the maneuvering area. During the trajectory adaptation, the cooperation vehicle 26 projects the maneuvering vehicle 34 onto its own lane as an imaginary object. Distance control with respect to the projected object can then be carried out. The trajectory may be effected, for example, by setting a suitable distance/time profile and therefore by setting suitable acceleration or deceleration values. As the maneuvering area 28 is approached, the executability of the driving maneuver of the maneuvering vehicle 34 is cyclically checked.

Figure 9:
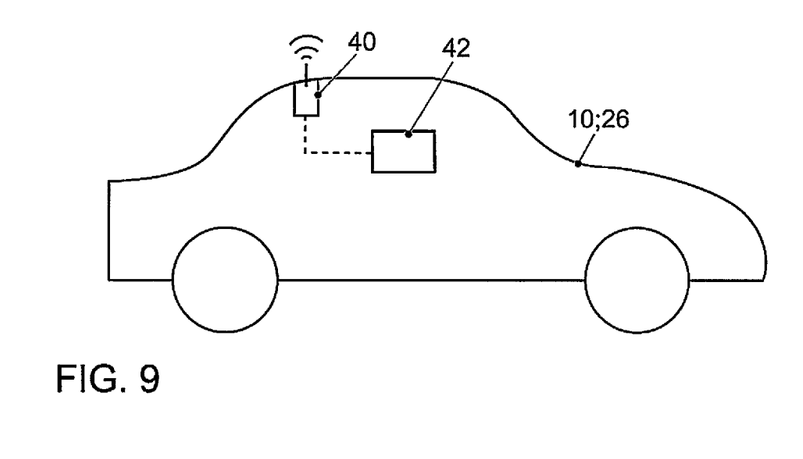
FIG. 9 shows a schematic illustration of a disclosed vehicle.

FIG. 9 shows a vehicle 10, 26. The vehicle 10, 26 comprises a communication device 40 for communicating with other vehicles by means of vehicle-to-vehicle communication, and a control device 42 for autonomously or semi-autonomously carrying out a driving maneuver. The vehicle 10, 26 is set up to execute the method for autonomously or semi-autonomously carrying out a cooperative driving maneuver according to one of Claims 1 to 9 as a maneuvering vehicle 10 and/or a cooperation vehicle 26.

By using vehicle-to-vehicle communication, the method proposed here allows a cooperative driving maneuver to be carried out safely and effectively irrespective of whether the maneuvering vehicle and the one or more cooperation vehicles detect each other using their vehicle sensor system.

LIST OF REFERENCE SYMBOLS

10 Maneuvering vehicle
12 Maneuvering area
14 Road
16 Vehicles
18 Potential cooperation vehicles
20 Cooperation vehicles
22 Approach area
24 Free area between vehicles
26 Cooperation vehicle
28 Maneuvering area
30 Road
32 Vehicles
34 Maneuvering vehicle
36 Approach area
38 Free area between vehicles
40 Communication device
42 Control device

The invention claimed is:

1. A method for autonomously or semi-autonomously carrying out a cooperative driving maneuver, wherein a maneuvering vehicle plans execution of a driving maneuver, wherein during the method the maneuvering vehicle executes operations for planning and execution of a single driving maneuver comprising:
   determining a maneuvering area of a road in which the driving maneuver is potentially executed;
   communicating with other vehicles via vehicle-to-vehicle communication during the planning of the execution of the cooperative driving maneuver;
   filtering communications received by the maneuvering vehicle via vehicle-to-vehicle communication from the vehicles, wherein the filtering is performed to determine which vehicles are relevant to carrying out the maneuvering vehicle's planned driving maneuver to detect cooperation vehicles which are presumed to be inside the maneuvering area during the execution of the driving maneuver;
   determining message formats of the messages received by the maneuvering vehicle via vehicle-to-vehicle communication;
   determining potential cooperation vehicles based on the message formats transmitted by the vehicles, and
   adapting the maneuvering vehicle's own driving behavior to presumable driving behavior of the one or more cooperation vehicles of the potential cooperation vehicles to execute the planned driving maneuver,
   wherein, in response to a determination that transmitted message formats are Environmental Perception Messages from the potential cooperation vehicles, wherein the Environmental Perception Messages contain information about free areas between the potential cooperation vehicles from the potential cooperation vehicles received by the maneuvering vehicle, the potential cooperation vehicles are determined to be one or more cooperation vehicles.

2. The method of claim 1, wherein the maneuvering vehicle determines an approach period in which the maneuvering vehicle is presumed to reach the maneuvering area.

3. The method of claim 1, wherein the maneuvering vehicle executes at least one of the following operations to detect the cooperation vehicles:
   determining approach areas of the road, from which the maneuvering area is theoretically reached within the approach period;
   determining potential cooperation vehicles which are in the approach areas based on the data received via vehicle-to-vehicle communication, predicting the driving behavior of each potential cooperation vehicle based on the data received via vehicle-to-vehicle communication;
   predicting its own driving behavior; and
   comparing the predicted driving behavior of the one or more potential cooperation vehicles with the maneuvering vehicle's own predicted driving behavior to determine the plurality of cooperation vehicles.

4. The method of claim 1, wherein the maneuvering vehicle continuously detects and evaluates the development of free areas between vehicles and, for this purpose, executes the following operations:
   determining the minimum size of a free area for carrying out the driving maneuver, the vehicle dimensions of the maneuvering vehicle and/or a safety distance;
   comparing the size of newly detected free areas with the determined minimum size; and
   selecting a suitable free area presumed to be inside the maneuvering area during the planned execution of the maneuver and to have at least the minimum size for executing the driving maneuver.

5. The method of claim 4, wherein the adaptation of the driving behavior of the maneuvering vehicle to the presumable driving behavior of the cooperation vehicles comprises adapting the trajectory of the maneuvering vehicle to reach the selected free area in response to the selected free area being inside the maneuvering area, wherein executability being cyclically checked as the free area is approached.

6. The method of claim 1, further comprising:
   determining a maneuvering area of a road in which a driving maneuver of a vehicle is expected;
   communicating between the cooperation vehicle and one or more vehicles via vehicle-to-vehicle communication to detect a maneuvering vehicle which plans the execution of a driving maneuver and is presumed to be inside the maneuvering area during the execution of the driving maneuver; and adapting the driving behavior of the cooperation vehicle to the presumable driving behavior of the maneuvering vehicle to assist with the planned driving maneuver of the maneuvering vehicle.

7. The method of claim 6, wherein the cooperation vehicle determines the maneuvering area and/or an approach period in which it will presumably reach the maneuvering area.

8. The method of claim 6, wherein the cooperation vehicle executes at least one of the following operations to detect the maneuvering vehicle:

determining the message formats of the messages received via vehicle-to-vehicle communication;

determining one or more potential maneuvering vehicles based on the message format transmitted by these vehicles;

determining approach areas of the road, from which the maneuvering area is theoretically reached within the approach period;

determining one or more potential maneuvering vehicles which are in the approach areas by the data received via vehicle-to-vehicle communication;

predicting the driving behavior of each potential maneuvering vehicle by the data received via vehicle-to-vehicle communication;

predicting its own driving behavior; and comparing the predicted driving behavior of the one or more potential maneuvering vehicles with the maneuvering vehicle's own predicted driving behavior to determine one or more maneuvering vehicles.

9. The method of claim 6, wherein the adaptation of the driving behavior of the cooperation vehicle to the presumable driving behavior of the maneuvering vehicle comprises the following operations:

adapting the trajectory of the cooperation vehicle to enlarge a free area in which the driving maneuver of the maneuvering vehicle is executed inside the maneuvering area.

10. A transportation vehicle comprising:

a communication device for communicating with other transportation vehicles by vehicle-to-vehicle communication; and the vehicle being configured to, operate as a maneuvering vehicle and/or as a cooperation vehicle, autonomously or semi-autonomously carrying out a cooperative driving maneuver, wherein in operating as a maneuvering vehicle, which plans the execution of a driving maneuver, the vehicle executes the following operations:

determining a maneuvering area of a road in which the driving maneuver is potentially executed;

communicating with vehicles via vehicle-to-vehicle communication with each of a plurality of other vehicles that are presumed to be inside the maneuvering area of the road during execution of the driving maneuver, filtering the communications received via vehicle-to-vehicle communication from the other vehicles according to vehicles which are relevant to carrying out the planned driving maneuver to detect cooperation vehicles;

determining message formats of the messages received via vehicle-to-vehicle communication from these vehicles;

determining potential cooperation vehicles based on the message formats transmitted by these vehicles; and adapting the maneuvering vehicle's own driving behavior to the presumable driving behavior of the cooperation vehicles to execute the planned driving maneuver, wherein in response to a determination that transmitted message formats are Environmental Perception Messages from the potential cooperation vehicles containing information about free areas between the potential cooperation vehicles, the potential cooperation vehicles are determined to be cooperation vehicles for the maneuvering vehicle.

11. The method of claim 1, wherein information of each Environmental Perception Message is determined by sensors in each potential cooperation vehicle.

12. The method of claim 11, wherein the sensors comprise radar sensors and the Environmental Perception Messages are transmitted several times a second.

13. The vehicle of claim 10, wherein information of each Environmental Perception Message is determined by sensors in each potential cooperation vehicle.

14. The vehicle of claim 13, wherein the sensors comprise radar sensors and the Environmental Perception Messages are transmitted several times a second.

15. The method of claim 1, wherein the driving maneuver comprises merging into a flow of vehicles, wherein the communicating with the other vehicles includes communicating with a plurality of vehicles presumed to be in a maneuvering area during the execution of the merging.

16. The transportation vehicle of claim 10, wherein the driving maneuver comprises merging into a flow of vehicles, wherein the communicating with the other vehicles includes communicating with a plurality of vehicles presumed to be in a merging area during the execution of the merging.

* * * * *